United States Patent [19]

Bauer et al.

[11] Patent Number: 4,507,227

[45] Date of Patent: Mar. 26, 1985

[54] COMMINUTING IRRADIATED FERRITIC STEEL

[75] Inventors: Roger E. Bauer; Jerry L. Straalsund, both of Kennewick, Wash.; Bryan A. Chin, Auburn, Ala.

[73] Assignee: The United States of America as represented by the United States Department of Energy, Washington, D.C.

[21] Appl. No.: 419,371

[22] Filed: Sep. 17, 1982

[51] Int. Cl.³ .............................................. G21F 9/28
[52] U.S. Cl. .................................... 252/626; 252/627; 423/4; 75/84.1 A
[58] Field of Search .............................. 252/626, 627; 75/84.1 A; 423/4

[56] References Cited

U.S. PATENT DOCUMENTS

| | | | |
|---|---|---|---|
| 2,962,371 | 11/1960 | McGeary | 75/84.1 |
| 3,089,751 | 5/1963 | Beaver et al. | |
| 3,726,956 | 4/1973 | Silver | 423/4 |
| 4,296,074 | 10/1981 | Yosim | 75/84.1 A |

Primary Examiner—Deborah L. Kyle
Attorney, Agent, or Firm—R. D. Fuerle

[57] ABSTRACT

Disclosed is a method of comminuting irradiated ferritic steel by placing the steel in a solution of a compound selected from the group consisting of sulfamic acid, bisulfate, and mixtures thereof. The ferritic steel is used as cladding on nuclear fuel rods or other irradiated components.

10 Claims, 1 Drawing Figure

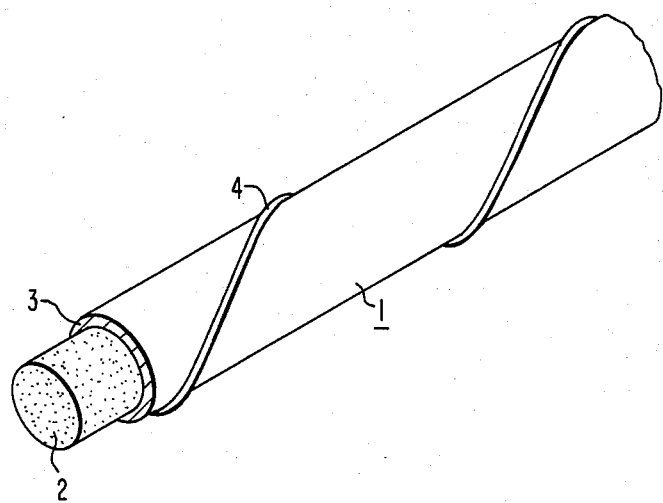

COMMINUTING IRRADIATED FERRITIC STEEL

The United States Government has rights in this invention pursuant to Contract No. DE-AC14-76FF02170 between the U.S. Department of Energy and the Westinghouse Electric Corporation and pursuant to Section 152 of the Atomic Energy Act of 1954.

BACKGROUND OF THE INVENTION

Fuel rods for nuclear reactors are prepared by filling cylindrical metal cladding with nuclear fuel pellets. When the activity of the fuel has declined to the point where the fuel rod is no longer efficient, the rod is removed from the reactor and the fuel is separated from the cladding for reprocessing. Many processes have been reviewed for separating the fuel from the cladding including dissolving the cladding in sulfuric acid or molten metal, melting the cladding, simultaneously dissolving the cladding and the core and simultaneously cutting and dissolving the core.

Current reprocessing technology uses a shear and leach process. In this process, individual fuel rods are fed into a shear where the rods are chopped into three inch segments. These segments are then transported to a chemical leacher where hot nitric acid is continuously recirculated over the sheared segments, dissolving the fuel. The cladding hulls are removed for washing, inspection, and releaching if all the fuel has not been dissolved. Separating the fuel from the cladding by dissolution takes from two to four hours for oxide fuels and approximately 24 hours for metal fuels. All solutions used to wash or releach the cladding are added to the fuel solution for further separation.

While the shearing and leaching process has been successfully used in the reprocessing of light water reactor fuel, its application to the reprocessing of liquid metal fast breeder reactor fuels is complicated by high rates of decay heat generation which requires cooling, the release of fission gases, the difficulty in containing fine core and clad particles during shearing, and the presence of liquid metal coolants such as sodium, which may react violently with hot nitric acid.

SUMMARY OF THE INVENTION

We have discovered that if fuel rod cladding is made of ferritic steel it can be comminuted by certain chemicals after radiation. We are able to reduce ferritic steel cladding to a powder in only a few minutes. Since ferritic steel is ferromagnetic it can be easily removed from the fuel using a magnet. The process of this invention eliminates the need to shear the fuel rods, and it removes any residual sodium which may be present prior to the introduction of the nitric acid.

PRIOR ART

U.S. Pat. No. 3,726,956 discloses the dissolution of tungsten or molybdenum fuel cladding in a sodium hypochloride solution at temperatures of 50° to 100° C.
U.S. Pat. No. 3,885,744 discloses the magnetic separation of fuel from cladding.

DESCRIPTION OF THE INVENTION

The accompanying drawing is a side view partially in section of a nuclear fuel rod according to this invention.
In the drawing, a nuclear fuel rod 1 consists of nuclear fuel pellets 2 in ferritic steel cladding 3 surrounded by optional wire wrap 4.

While the process of this invention may be applied to ferritic steel which has been used in almost any application, it is particularly suitable to comminute the ferritic steel cladding of nuclear fuel rods. These rods are typically about 12 feet long and ¼ inch in diameter with a cladding of 15 mils. The fuel used is usually a mixture of plutonium and uranium oxide. Ferritic steels are a particular type of steel of a variety of compositions, typically 12 percent ±2 percent by weight chromium, 0.6 percent ±2 percent nickel, 0.2±0.15 percent carbon, 0.6±0.3 percent manganese, 1.0±0.6 percent molybdenum, 0.4±0.2 percent silicon, 0.3±0.2 percent vanadium, 0.5±0.5 percent tungsten, and the rest iron. Fuel rods are usually made by filling the cylindrical cladding with pellets of the fuel. After a few months in a nuclear reactor, the cladding becomes irradiated which makes it dissolvable in the chemical solution used in this invention. To dissolve or comminute a fuel rod, the rod is placed in a reaction vessel that is preferably heated and ultrasonically agitated. A solution of water plus the chemicals is added in a controlled manner, such as by spraying, to react with any exposed sodium, and then additional solution is added until the pins are submerged. The solution is preferably kept at about 40° to about 90° C.

As dilute solutions require more time, the solution used to comminute the irradiated ferritic steel should be as concentrated as possible, preferably at least 95 percent concentrated. The chemicals used in the solution are sulfamic acid, a bisulfate, or a mixture thereof. While any alkaline metal or alkaline earth metal bisulfate can be used, or a compound which produces a bisulfate in solution, the preferred bisulfate is sodium bisulfate. It is preferable to use equal proportions of sulfamic acid and the bisulfate as this appears to be most effective. The solution will work only on ferritic steel and seems to have no effect on austenitic steels or high nickel steels. Also, the solution is relatively ineffective on ferritic steel which has not been irradiated. Dissolution in the solution occurs very rapidly, usually in a few minutes.

If the solution is used to comminute nuclear fuel rods, the comminuated ferritic steel is then removed from the pellets of nuclear fuel. This can be accomplished by sieving the pellets, leaving behind the powdered ferritic steel cladding, or by other methods, but the most advantageous method is to remove the powdered ferritic steel cladding by means of a magnet.

The following examples further illustrate this invention.

EXAMPLE

In this example three types of ferritic steel were used. The following table give their compositions:

| Ferritic Steel No. | Composition Weight Percent | | | | | | | | |
|---|---|---|---|---|---|---|---|---|---|
| | Fe | Cr | Ni | C | Mo | Mn | Si | V | W |
| 1 | Bal. | 12 | 0.6 | 0.2 | 1 | 0.6 | 0.4 | 0.3 | 0.5 |
| 2 | Bal. | 10.5 | 0.5 | 0.05 | 6 | 0.5 | 0.3 | 0.4 | — |
| 3 | Bal. | 11 | 0.6 | 0.13 | 0.9 | 0.8 | 0.4 | 0.2 | — |

Specimens were made of the three ferritic steels in the form of cladding 0.180 inches outside diameter by 0.164 inches inside diameter by 0.9 inches long, and in the form of sheets 1.6 inches long and 0.195 inches wide by 0.030 inches thick. The cladding and sheets were irradiated to a fluence of $3 \times 10^{22}$ neutrons per square centimeter, and were placed for alpha decontamination in an ultrasonically agitated bath containing a solution of approximately two grams of a 95 percent aqueous mixture of 50 percent sulfamic acid and 50 percent sodium bisulfate sold by Turco products under the trade designation "Turco 4306-D." The bath was at a temperature between 45° and 95° centigrade. After 10 minutes, the solution was changed to promote cleaning, at which time varying amounts of disintegration of the three steels was noted. A specimen account showed all specimens of ferritic steel No. 2 to have been powderized. Ferritic steel No. 3 showed approximately 30 percent weight loss and ferritic steel No. 1 approximately a 20 percent weight loss. A heavy slurry of powder was found in this solution.

We claim:

1. A method of comminuting irradiated ferritic steel comprising placing said steel into a solution of a compound selected from the group consisting of sulfamic acid, bisulfate compounds, and mixtures thereof.

2. A method according to claim 1 wherein said compound is about 50% sulfamic acid and about 50% sodium bisulfate.

3. A method according to claim 1 wherein said steel is fuel rod cladding from a nuclear reactor.

4. A method according to claim 1 wherein said solution is an aqueous solution at least about 95% saturated.

5. A method according to claim 1 including the additional last step of separating said comminuted irradiated ferritic steel from said solution.

6. A method according to claim 5 wherein said ferritic steel is separated from said solution by sieving.

7. A method according to claim 1 wherein said solution is ultrasonically agitated.

8. A method according to claim 1 wherein said solution is heated to about 40° to about 90° C.

9. A method of separating the nuclear fuel in reactor fuel rods from their irradiated ferritic steel cladding, comprising comminuting said cladding by immersing said fuel rods in a solution of a compound selected from the group consisting of sulfamic acid, bisulfate, and mixtures thereof, and separating said comminuted cladding from said fuel.

10. A method according to claim 9 wherein said comminuted cladding is separated from said fuel with a magnet.

* * * * *